(12) United States Patent
Shitrit

(10) Patent No.: US 11,786,347 B2
(45) Date of Patent: Oct. 17, 2023

(54) METHOD AND SYSTEM FOR ADDITIVE MANUFACTURING WITH A SACRIFICIAL STRUCTURE FOR EASY REMOVAL

(71) Applicant: Stratasys Ltd., Rehovot (IL)

(72) Inventor: Yaniv Shitrit, Ashkelon (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/279,762

(22) PCT Filed: Sep. 26, 2019

(86) PCT No.: PCT/IL2019/051067
§ 371 (c)(1),
(2) Date: Mar. 25, 2021

(87) PCT Pub. No.: WO2020/065653
PCT Pub. Date: Apr. 2, 2020

(65) Prior Publication Data
US 2022/0031435 A1 Feb. 3, 2022

Related U.S. Application Data

(60) Provisional application No. 62/737,129, filed on Sep. 27, 2018.

(51) Int. Cl.
*A61C 13/34* (2006.01)
*B33Y 10/00* (2015.01)
(Continued)

(52) U.S. Cl.
CPC .......... *A61C 13/34* (2013.01); *A61C 13/0019* (2013.01); *B29C 64/112* (2017.08);
(Continued)

(58) Field of Classification Search
CPC ..... A61C 13/34; A61C 13/0019; B33Y 10/00; B33Y 30/00; B33Y 50/00; B33Y 80/00;
(Continued)

(56) References Cited

U.S. PATENT DOCUMENTS 5,503,785 A  4/1996 Crump et al.
6,228,923 B1  5/2001 Lombardi et al.
(Continued)

FOREIGN PATENT DOCUMENTS

CN  1544231  11/2004
CN  1665877  9/2005
(Continued)

OTHER PUBLICATIONS

No author credited, www.simplify3d.com/support/articles/rafts-skirts-and-brims/, Wayback Machine search date: Sep. 6, 2016, pp. 1-5. (Year: 2016).*

(Continued)

*Primary Examiner* — Matthew J Daniels
*Assistant Examiner* — Gregory C. Grosso

(57) ABSTRACT

A method of additive manufacturing of three-dimensional objects by sequentially dispensing and solidifying layers. The layers may include (i) stacks of model layers arranged in configured patterns corresponding to shapes of one or more objects and being made of one or more modeling materials; (ii) an intermediate layer surrounding said shapes of one or more objects and comprising at least a support material, and (iii) a flexible overlay surrounding said first intermediate layer, the intermediate layer and flexible overlay forming a flexible sacrificial structure. The model stack or stacks can be removed from the flexible sacrificial structure by application of pressure to the flexible sacrificial structure, separating the model stack from the flexible structure along the intermediate layer.

14 Claims, 15 Drawing Sheets

(51) Int. Cl.

| | | |
|---|---|---|
| *B33Y 30/00* | (2015.01) | |
| *B33Y 50/00* | (2015.01) | |
| *B33Y 80/00* | (2015.01) | |
| *B29C 64/112* | (2017.01) | |
| *B29C 64/386* | (2017.01) | |
| *B29C 64/209* | (2017.01) | |
| *B29C 64/35* | (2017.01) | |
| *B29C 64/40* | (2017.01) | |
| *B29C 64/336* | (2017.01) | |
| *B33Y 40/20* | (2020.01) | |
| *A61C 13/00* | (2006.01) | |

(52) U.S. Cl.
CPC .......... *B29C 64/209* (2017.08); *B29C 64/336* (2017.08); *B29C 64/35* (2017.08); *B29C 64/386* (2017.08); *B29C 64/40* (2017.08); *B33Y 10/00* (2014.12); *B33Y 30/00* (2014.12); *B33Y 40/20* (2020.01); *B33Y 50/00* (2014.12); *B33Y 80/00* (2014.12)

(58) Field of Classification Search
CPC ..... B33Y 40/20; B29C 64/112; B29C 64/386; B29C 64/209; B29C 64/35; B29C 64/40; B29C 64/336
USPC .......................................................... 264/138
See application file for complete search history.

(56) References Cited

U.S. PATENT DOCUMENTS

| | | | |
|---|---|---|---|
| 6,259,962 | B1 | 7/2001 | Gothait |
| 6,569,373 | B2 | 5/2003 | Napadensky |
| 6,658,314 | B1 | 12/2003 | Gothait |
| 6,850,334 | B1 | 2/2005 | Gothait |
| 7,104,773 | B2 | 9/2006 | Maekawa et al. |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,255,825 | B2 | 8/2007 | Nelsen et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 8,865,047 | B2 | 10/2014 | Sella |
| 9,031,680 | B2 | 5/2015 | Napadensky |
| 9,227,365 | B2 | 1/2016 | Dikovsky et al. |
| 2002/0096112 | A1 | 7/2002 | Coc |
| 2004/0187714 | A1* | 9/2004 | Napadensky ........... B29C 64/40 101/35 |
| 2005/0069784 | A1 | 3/2005 | Gothait et al. |
| 2005/0124491 | A1 | 6/2005 | Hopkins |
| 2005/0233130 | A1 | 10/2005 | Grefenstein et al. |
| 2007/0168815 | A1 | 7/2007 | Napadensky et al. |
| 2008/0121130 | A1 | 5/2008 | Kritchman |
| 2010/0140850 | A1 | 6/2010 | Napadensky et al. |
| 2010/0191360 | A1 | 7/2010 | Napadensky et al. |
| 2012/0308805 | A1 | 2/2012 | Fowler et al. |
| 2012/0178845 | A1 | 7/2012 | Napadensky et al. |
| 2012/0261848 | A1* | 10/2012 | Haraszati ............... B33Y 80/00 264/17 |
| 2013/0011562 | A1 | 1/2013 | Varanka |
| 2015/0151487 | A1 | 6/2015 | Leighton et al. |
| 2015/0250971 | A1 | 9/2015 | Bachelder et al. |
| 2016/0001505 | A1 | 1/2016 | Hakkaku et al. |
| 2016/0100917 | A1 | 4/2016 | Howe |
| 2016/0136903 | A1* | 5/2016 | Herran ................... B29C 64/118 264/308 |
| 2016/0185050 | A1 | 6/2016 | Topolkaraev et al. |
| 2016/0355694 | A1 | 12/2016 | Okamoto |
| 2017/0087775 | A1* | 3/2017 | Sakai ................... B29C 64/118 |
| 2017/0136706 | A1 | 5/2017 | Hakkaku |
| 2017/0151718 | A1 | 6/2017 | Rolland et al. |
| 2017/0239886 | A1 | 8/2017 | Norikane |
| 2018/0111316 | A1 | 4/2018 | Schaufelberger et al. |
| 2018/0141241 | A1 | 5/2018 | Staal et al. |
| 2018/0281294 | A1 | 10/2018 | Gottschalk-Gaudic et al. |
| 2020/0198250 | A1 | 6/2020 | Shitrit et al. |
| 2020/0331195 | A1 | 10/2020 | Rumbak et al. |
| 2023/0191707 | A1 | 6/2023 | Shitrit et al. |

FOREIGN PATENT DOCUMENTS

| | | |
|---|---|---|
| CN | 1926470 | 3/2007 |
| CN | 102037064 | 4/2011 |
| CN | 103347682 | 10/2013 |
| CN | 103568325 | 2/2014 |
| CN | 204894515 | 12/2015 |
| CN | 105582571 | 5/2016 |
| CN | 105637035 | 6/2016 |
| CN | 106045503 | 10/2016 |
| CN | 106458659 | 2/2017 |
| CN | 106515000 | 3/2017 |
| CN | 106660266 | 5/2017 |
| EP | 2150077 | 2/2010 |
| EP | 3002110 | 4/2016 |
| EP | 3053728 | 8/2016 |
| EP | 3064193 | 9/2016 |
| JP | 07-195530 | 8/1995 |
| JP | 2004-255839 | 9/2004 |
| JP | 2010-537720 | 12/2010 |
| JP | 2015-038166 | 2/2015 |
| JP | 2015-123743 | 7/2015 |
| JP | 2015-131469 | 7/2015 |
| JP | 2015-136915 | 7/2015 |
| JP | 2015-168202 | 9/2015 |
| JP | 2016-26915 | 2/2016 |
| JP | 2016-078284 | 5/2016 |
| JP | 2017-43041 | 3/2017 |
| WO | WO 2009/032228 | 3/2009 |
| WO | WO 2015/105047 | 7/2015 |
| WO | WO 2016/125816 | 8/2016 |
| WO | WO 2018/220632 | 12/2018 |
| WO | WO 2019/130292 | 7/2019 |
| WO | WO 2018/220632 A9 | 3/2020 |
| WO | WO 2020/065653 | 4/2020 |

OTHER PUBLICATIONS

Translation Dated Apr. 18, 2022 of Decision of Rejection dated Mar. 16, 2022 From the State Intellectual Property Office of the People's Republic of China Re. Application No. 201880046410.6. (8 Pages).

Notification of Office Action and Search Report dated Sep. 24, 2021 From the State Intellectual Property Office of the People's Republic of China Re. Application No. 201880088471.9. (11 Pages).

Notification of Office Action dated Aug. 23, 2021 From the State Intellectual Property Office of the People's Republic of China Re. Application No. 201880046410.6. (6 Pages).

Notification of Office Action and Search Report dated Apr. 8, 2022 From the State Intellectual Property Office of the People's Republic of China Re. Application No. 201980061346.3 and Its Translation of Office Action Into English. (9 Pages).

Notification of Office Action dated Apr. 13, 2022 From the State Intellectual Property Office of the People's Republic of China Re. Application No. 201880088471.9 and Its Translation Into English. (9 Pages).

Communication Pursuant to Article 94(3) EPC dated Apr. 5, 2022 From the European Patent Office Re. Application No. 18819471.6. (3 Pages).

Decision of Rejection dated Mar. 16, 2022 From the State Intellectual Property Office of the People's Republic of China Re. Application No. 201880046410.6 and Its English Summary. (8 Pages).

Notification of Office Action and Search Report dated Sep. 24, 2021 From the State Intellectual Property Office of the People's Republic of China Re. Application No. 201880088471.9 and Its English Summary. (13 Pages).

Official Action dated May 31, 2022 from US Patent and Trademark Office Re. U.S. Appl. No. 16/618,133. (34 pages).

(56) References Cited

OTHER PUBLICATIONS

Communication Pursuant to Article 94(3) EPC dated Apr. 26, 2021 From the European Patent Office Re. Application No. 18819471.6. (7 Pages).
Notification of Office Action dated Dec. 15, 2021 From the State Intellectual Property Office of the People's Republic of China Re. Application No. 201880046410.6. (7 Pages).
Notice of Reasons for Rejection dated Jun. 24, 2022 From the Japan Patent Office Re. Application No. 2020-536689 and Its Translation Into English. (6 Pages).
Communication Pursuant to Article 94(3) EPC dated Jul. 7, 2020 From the European Patent Office Re. Application No. 18739649.4. (3 Pages).
Grounds of Reasons for Rejection dated Mar. 3, 2020 From the Korean Patent Office Re. Application No. 10-2019-7038817 and Its Translation Into English. (12 Pages).
Grounds of Reasons for Rejection dated Aug. 21, 2020 From the Korean Patent Office Re. Application No. 10-2019-7038817 and its Translation Into English. (5 Pages).
International Preliminary Report on Patentability dated Apr. 8, 2021 From the International Bureau of WIPO Re. Application No. PCT/IL2019/051067. (8 Pages).
International Preliminary Report on Patentability dated Jul. 9, 2020 From the International Bureau of WIPO Re. Application No. PCT/IL2018/051296. (13 Pages).
International Preliminary Report on Patentability dated Dec. 12, 2019 From the International Bureau of WIPO Re. Application No. PCT/IL2018/050590. (10 Pages).
International Search Report and the Written Opinion dated Feb. 6, 2020 From the International Searching Authority Re. Application No. PCT/IL2019/051067. (12 Pages).
International Search Report and the Written Opinion dated Mar. 8, 2019 From the International Searching Authority Re. Application No. PCT /IL2018/051296. (20 Pages).
International Search Report and the Written Opinion dated Oct. 12, 2018 From the International Searching Authority Re. Application No. PCT/IL2018/050590. (17 Pages).
Notice of Reason for Rejection dated Nov. 27, 2020 From the Japan Patent Office Re. Application No. 2019-566114 and Its Translation Into English. (5 Pages).
Notice of Reason for Rejection dated Jun. 30, 2020 From the Japan Patent Office Re. Application No. 2019-566114 and Its Translation Into English. (11 Pages).

Notification of Office Action and Search Report dated Mar. 25, 2021 From the State Intellectual Property Office of the People's Republic of China Re. Application No. 201880046410.6 and Its Translation of Office Action Into English. (14 Pages).
Notification of Office Action and Search Report dated Sep. 28, 2020 From the State Intellectual Property Office of the People's Republic of China Re. Application No. 201880046410.6 and Its Translation of Office Action Into English. (9 Pages).
Office Action dated May 9, 2021 From the Israel Patent Office Re. Application No. 278176 and Its Translation Into English. (7 Pages).
Office Action dated Mar. 29, 2020 From the Israel Patent Office Re. Application No. 270998 and Its Tranlation Into English. (5 Pages).
Official Action dated Nov. 13, 2020 from the US Patent and Trademark Office Re. U.S. Appl. No. 16/618,133. (36 pages).
Official Action dated Mar. 26, 2021 from the US Patent and Trademark Office Re. U.S. Appl. No. 16/618,133. (19 pages).
Final Official Action dated Sep. 13, 2021 from the US Patent and Trademark Office Re. U.S. Appl. No. 16/618,133. (22 pages).
Translation Dated Sep. 8, 2021 of Notification of Office Action dated Aug. 23, 2921 From the State Intellectual Property Office of the People's Republic of China Re. Application No. 201880046410. 6. (8 Pages).
Translation of Notification of Office Action dated Sep. 1, 2022 From the State Intellectual Property Office of the People's Republic of China Re. Application No. 201880088471.9. (5 Pages).
Notice of Reasons for Rejection dated Feb. 25, 2022 From the Japan Patent Office Re. Application No. 2021-71914 and Its Translation Into English. (9 Pages).
Notification of Office Action dated Sep. 1, 2022 From the State Intellectual Property Office of the People's Republic of China Re. Application No. 201880088471.9. (5 Pages).
Notice of Allowance dated Oct. 4, 2022 from US Patent and Trademark Office Re. U.S. Appl. No. 16/618,133. (18 pages).
Notice of Reason(s) for Rejection dated Oct. 21, 2022 From the Japan Patent Office Re. Application No. 2021-517020 and Its Translation Into English.(6 pages).
Official Action dated Nov. 10, 2022 from the US Patent and Trademark Office Re. U.S. Appl. No. 16/914,392. (78 pages).
Restriction Official Action dated Aug. 17, 2022 from US Patent and Trademark Office Re. U.S. Appl. No. 16/914,392. (12 pages).
Official Action dated May 25, 2023 from the US Patent and Trademark Office Re. U.S. Appl. No. 16/914,392. (26 pages).
Restriction Official Action dated Apr. 27, 2023 From the US Patent and Trademark Office Re. U.S. Appl. No. 18/111,625. (8 Pages).

\* cited by examiner

METHOD AND SYSTEM FOR ADDITIVE MANUFACTURING WITH A SACRIFICIAL STRUCTURE FOR EASY REMOVAL

RELATED APPLICATIONS

This application is a National Phase of PCT Patent Application No. PCT/IL2019/051067 having International filing date of Sep. 26, 2019, which claims the benefit of priority under 35 USC § 119(e) of U.S. Provisional Patent Application No. 62/737,129 filed on Sep. 27, 2018.

The contents of the above applications are all incorporated by reference as if fully set forth herein in their entirety.

FIELD AND BACKGROUND OF THE INVENTION

The present invention, in some embodiments thereof, relates to additive manufacturing (AM), and, more particularly, but not exclusively, to a method and system for additive manufacturing that includes an easily removable sacrificial structure.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846 and 9,031,680, all by the same Assignee, and being hereby incorporated by reference in their entirety.

The building material of a typical AM process, includes a modeling material (also referred to as "modeling material"), which is deposited to produce the desired object, and a support material (also referred to as "supporting material" or "support material") which provides temporary support to specific regions of the object during building and for assuring adequate vertical placement of subsequent object layers. For example, in cases where objects include overhanging features or shapes, e.g., curved geometries, negative angles, voids, and the like, objects are typically constructed using adjacent support constructions, which are used during the printing and then subsequently removed in order to reveal the final shape of the fabricated object.

Known methods for removal of support materials include water-jet impact, chemical methods, such as dissolution in a solvent, oftentimes in combination with thermal treatment. For example, for water soluble support material, the fabricated object, including the support, is immersed in water capable of dissolving the support material.

Support materials for AM are described, for example, in U.S. Pat. Nos. 6,228,923, 7,255,825, 7,479,510, 7,183,335 and 6,569,373, all to the present Assignee and being incorporated by reference in their entirety.

U.S. Pat. No. 8,865,047, assigned to the present Assignee and being incorporated by reference in its entirety, discloses a method of constructing a support construction in which the support construction includes a strip that intersects the layers in a volume designed to be an empty space in the 3D object. The support construction is removed from the volume by application of a lifting force on the strip.

SUMMARY OF THE INVENTION

The present embodiments may relate to an object or objects covered by an easily removable flexible sacrificial structure. In order to facilitate removal of the flexible sacrificial structure, the sacrificial structure comprises an overlay of a flexible composite material covering the object/s, and an intermediate layer made of support material between the overlay and the object surface to ease removal of the object from the flexible sacrificial structure. The object may be separated from the flexible sacrificial structure by pressing the object out of its surrounding sacrificial structure.

The composite material of the flexible sacrificial structure may be formed by interlaced dispensing of modeling material and support material. The interlaced dispensing optionally and preferably produces a flexible sacrificial structure from which the object can be released by application of pressure to the flexible sacrificial structure.

In addition, a method is provided to generate multiple objects or object parts within a shared flexible sacrificial structure. The objects or object parts are formed at predefined distances from each other on the printing surface or tray, with a covering of flexible sacrificial structure over and between them, and as such are easily and separately removable from the flexible sacrificial structure after the fabrication process is complete.

The present embodiments may relate particularly to printed sets of denture models. Denture models may be provided as upper and lower sets and each set is customized for the individual patient, so that additive manufacturing is an efficient and highly appropriate form of manufacture for such objects. According to the present embodiments each denture model, that is each separate upper or lower denture model, may be printed within its own flexible sacrificial structure, or alternatively a number of upper and lower denture models may be printed within a common flexible sacrificial structure and removed separately therefrom.

According to one aspect of the present invention there is provided a method of additive manufacturing of one or more three-dimensional objects, comprising:

sequentially dispensing and solidifying layers, the layers comprising:

(i) at least one stack of model layers arranged in configured patterns corresponding to shapes of the one or more of the objects and being made of one or more modeling materials;

(ii) an intermediate layer surrounding the at least one stack and comprising at least a support material;

(iii) a flexible overlay surrounding the intermediate layer and object; and removing the stack of model layers from the flexible overlay by application of pressure to the flexible overlay.

In an embodiment, the flexible overlay comprises a first predetermined combination, the first predetermined combination comprising at least one modeling material and at least one support material.

In an embodiment, the flexible overlay comprises a plurality of voxels, with voxels of modeling material interspersed with voxels of support material.

In an embodiment, the flexible overlay is flexible and the removing comprises pushing a respective stack of model layers out of the flexible overlay.

In an embodiment, the first intermediate layer is between one and ten voxels in thickness.

In an embodiment, the intermediate layer is eight voxels in thickness.

In an embodiment, the intermediate layer is hydrophilic.

The method may comprise placing the three-dimensional object in a controlled temperature environment for a predetermined time prior to and/or during its removal from the flexible overlay.

In an embodiment, the controlled temperature environment is a controlled temperature water bath.

In an embodiment, the first predetermined combination comprises at least 60% modeling material.

In an embodiment, the first predetermined combination comprises an increase in a percentage of the modeling material towards an outer surface.

The method may comprise printing the objects on a printing tray, and providing a skirt structure around and between the flexible overlay covering each object, the objects and flexible overlay being breakably joined by skirts.

In an embodiment, the skirt structures comprise a second predetermined combination of the one or more modeling materials and the support material.

In an embodiment, the second predetermined combination comprises at least 90% modeling material.

The method may comprise using a support structure, the support structure being outside of the flexible overlay with respect to the object.

The method may comprise extracting the objects and placing in a cleaning solution for a predetermined duration.

In an example, the objects are denture models.

According to a second aspect of the present invention there is provided a 3D printed construction containing one or more objects, the product comprising:

(i) at least one stack of model layers arranged in configured patterns, each stack corresponding to shapes of the one or more objects and being made of one or more modeling materials;

(ii) an intermediate layer surrounding the shapes of one or more objects and comprising a support material;

(iii) a flexible overlay surrounding the intermediate coating, wherein the stack of model layers is removable from the flexible overlay by application of pressure to the flexible overlay.

In an embodiment, the flexible overlay comprises a first predetermined combination, the first predetermined combination comprising one of the one or more modeling materials and at least one support material.

In an embodiment, the flexible overlay is relatively less flexible than the intermediate layer, thereby to ensure that when the flexible overlay is separated from the model stack, the separation occurs along the first intermediate layer.

In an embodiment, the intermediate layer is between one and ten voxels in thickness.

In an embodiment, the intermediate layer is eight voxels in thickness.

In an embodiment, the intermediate layer is hydrophilic.

In an embodiment, the first predetermined combination comprises at least 60% modeling material.

In an embodiment, the first predetermined combination comprises an increase in an amount of modeling material towards an outer surface.

A skirt structure may be provided around and between the flexible overlay covering each object, the objects and flexible overlay being breakably joined at the skirts.

In an embodiment, the skirt structures comprise a second predetermined combination of the one or more modeling materials and at least one support material.

In an embodiment, the second predetermined combination comprises at least 90% modeling material.

Embodiments may comprise a support structure, the support structure being outside of the flexible overlay with respect to the object.

According to a third aspect of the present invention there is provided a computer software product, comprising a computer-readable medium in which program instructions are stored, which instructions, when read by a computerized controller of an additive manufacturing system, cause the system to sequentially dispense and solidify a plurality of layers comprising:

(i) one or more stacks of model layers arranged in configured patterns corresponding to shapes of one or more objects and being made of one or more modeling materials;

(ii) an intermediate layer surrounding the shapes of one or more objects and comprising at least a support material; and (iii) a flexible overlay surrounding the intermediate layer, the stack of model layers being removable from the flexible overlay by separation along the first intermediate coating.

According to a fourth aspect of the present invention there is provided a system for fabricating a three-dimensional object by additive manufacturing, the system comprising:

a plurality of dispensing heads, having at least a first dispensing head configured for dispensing at least one modeling material, a second dispensing head configured for dispensing a support material, a solidification system configured for solidifying each of the materials; and a computerized controller having a circuit configured for operating the dispensing heads and solidification system to sequentially dispense and solidify a plurality of layers comprising:

(i) one or more stacks of model layers arranged in configured patterns corresponding to shapes of one or more objects and being made of one or more modeling materials;

(ii) an intermediate layer surrounding the shapes of one or more objects and comprising at least one support material; and (iii) a flexible overlay surrounding the intermediate layer and being removable by separation at the first intermediate coating.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the planning and printing operations used in the present embodiments can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing printing tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
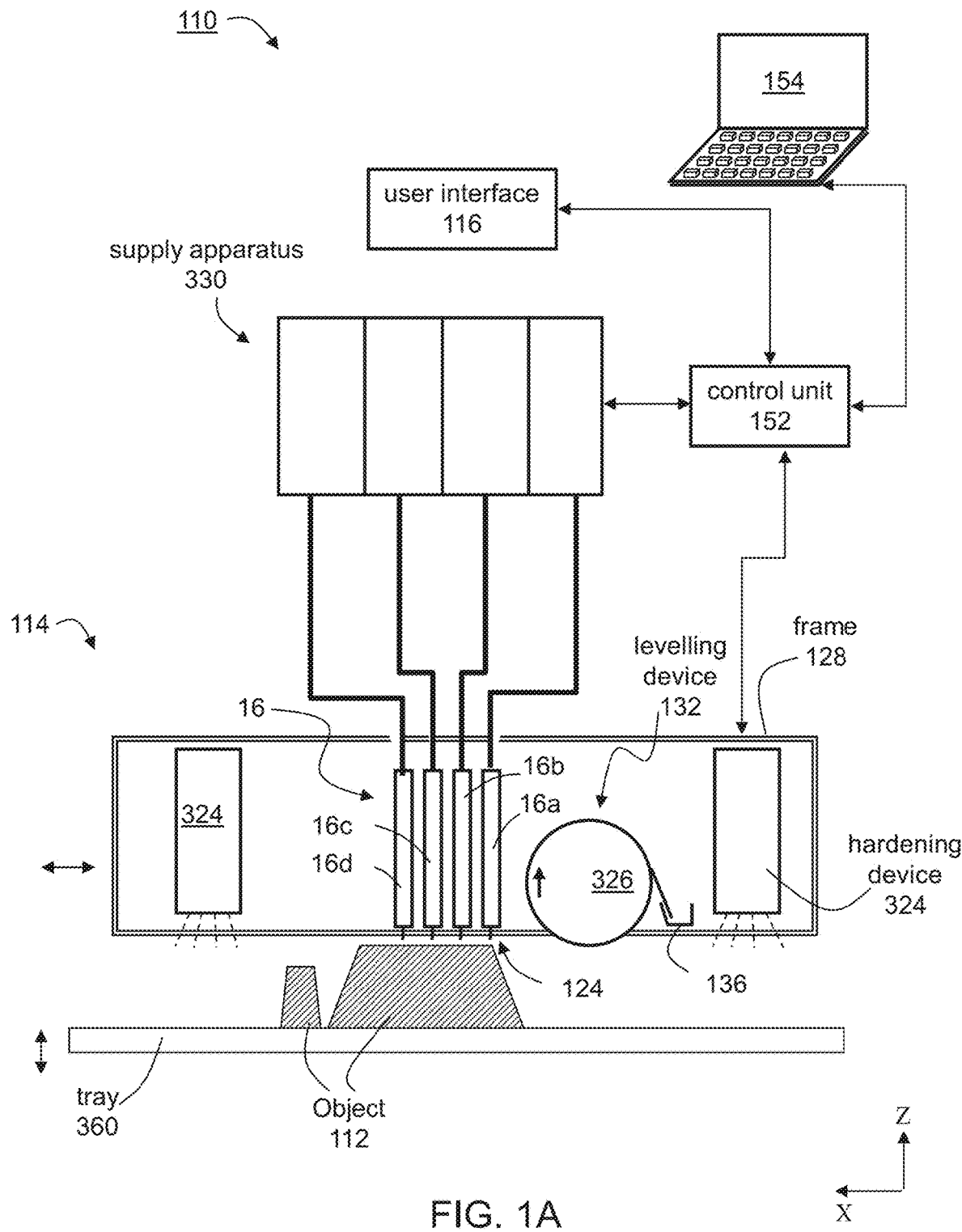
FIGS. 1A-D are schematic illustrations of an additive manufacturing system according to some embodiments of the invention.

The present invention, in some embodiments thereof, relates to additive manufacturing (AM), and, more particularly, but not exclusively, to a method and system for additive manufacturing of a sacrificial structure that is removable.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof. The term "object" describes a final product of the additive manufacturing. This term refers to the product obtained by a method as described herein, after removal of the support material, if such has been used as part of the building materials. The "object" therefore essentially consists (at least 95 weight percent) of a hardened (e.g., cured) modeling material.

Each layer is formed by additive manufacturing apparatus which scans a two-dimensional surface and places building material at selected voxels on the surface according to a pattern. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is optionally and preferably able to form a three-dimensional object on its own, i.e., without having to be mixed or combined with any other substance.

The final three-dimensional object is made of the modeling material or a combination of two or more modeling materials, or a combination of modeling and support materials, or modification thereof (e.g., following solidification, such as, but not limited to, curing). All these operations are well-known to those skilled in the art of solid freeform fabrication.

In some embodiments of the invention an object is manufactured by dispensing two or more different modeling materials, each material from a different dispensing head of the AM. However, this need not necessarily be the case, since, for in some embodiments it may not be necessary to dispense more than one modeling material. In these embodiments, an object is manufactured by dispensing a single modeling material, and optionally and preferably a single support material. These embodiments are particularly preferred when the object is manufactured by a system that includes only one modeling material dispensing head and one support material dispensing head. These embodiments are also preferred when is manufactured by a system that includes two or more modeling material dispensing heads and one support material dispensing head, but it is desired to operate the system in a high throughput mode, wherein all the modeling material dispensing heads receive and dispense the same modeling material.

The material(s) are optionally and preferably deposited in layers during the same pass of the printing heads. The material(s) and combination of materials within the layer can be selected according to the desired properties of the object.

Figure 2A:
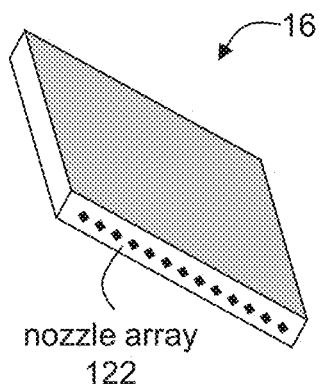
FIGS. 2A-2C are schematic illustrations of printing heads according to some embodiments of the present invention.
Figure 2B:
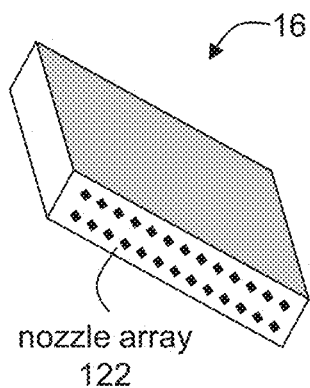
Figure 2C:
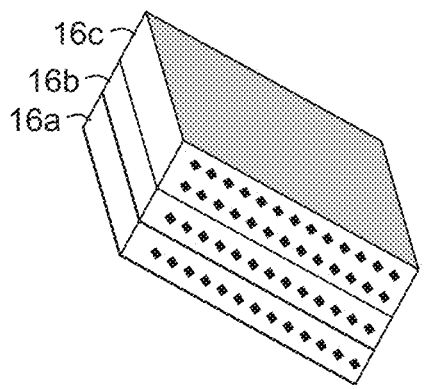

A representative and non-limiting example of a system 110 suitable for AM of an object 112 according to some embodiments of the present invention is illustrated in FIG. 1A. System 110 can comprise an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material 124 is dispensed.

Preferably, but not obligatorily, apparatus 114 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature controller (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material(s) and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material. In another alternative embodiment, heads 16a and 16b, may both dispense the same modeling material, or be combined in a single head having two nozzle arrays for depositing a modeling material. In another alternative embodiment, dispensing unit 16 comprises only head 16a (for dispensing a modeling material) and 16c (for dispensing a support material), and system 110 does not include any additional dispensing head other than heads 16a and 16c.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature controller and a material level sensor of its own, and receives an individually controlled voltage for its operation.

Apparatus 114 can further comprise a solidification system 324 which can include any device configured to emit light, heat or the like that may cause the deposited material to solidify and optionally and preferably harden. For example, solidification system 324 can comprise one or more radiation sources, which can be, for example, an ultraviolet or visible or infrared lamp, or other sources of electromagnetic radiation, or electron beam source, depending on the modeling material being used. In some embodiments of the present invention, solidification system 324 serves for curing or solidifying the modeling material.

The dispensing heads and radiation source are preferably mounted on a frame or block 128 which is preferably operative to reciprocally move over a tray 360, which serves as the working surface. In some embodiments of the present invention the radiation sources are mounted in the block such that they follow in the wake of the dispensing heads to at least partially solidify (e.g., cure) the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction.

Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A computerized controller 152 controls fabrication apparatus 114 and optionally and preferably also supply system 330. Controller 152 typically includes an electronic circuit configured to perform the controlling operations. Controller 152 preferably communicates with a data processor 154 which transmits digital data pertaining to fabrication instructions based on computer object data, e.g., a CAD configuration represented on a computer readable medium in any of the aforementioned formats (e.g., STL). Typically, controller 152 controls the voltage applied to each dispensing head or nozzle array and the temperature of the building material in the respective printing head.

Once the manufacturing data is loaded to controller 152 it can operate without user intervention. In some embodiments, controller 152 receives additional input from the operator, e.g., using data processor 154 or using a user interface 116 communicating with unit 152. User interface 116 can be of any type known in the art, such as, but not limited to, a keyboard, a touch screen and the like. For example, controller 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
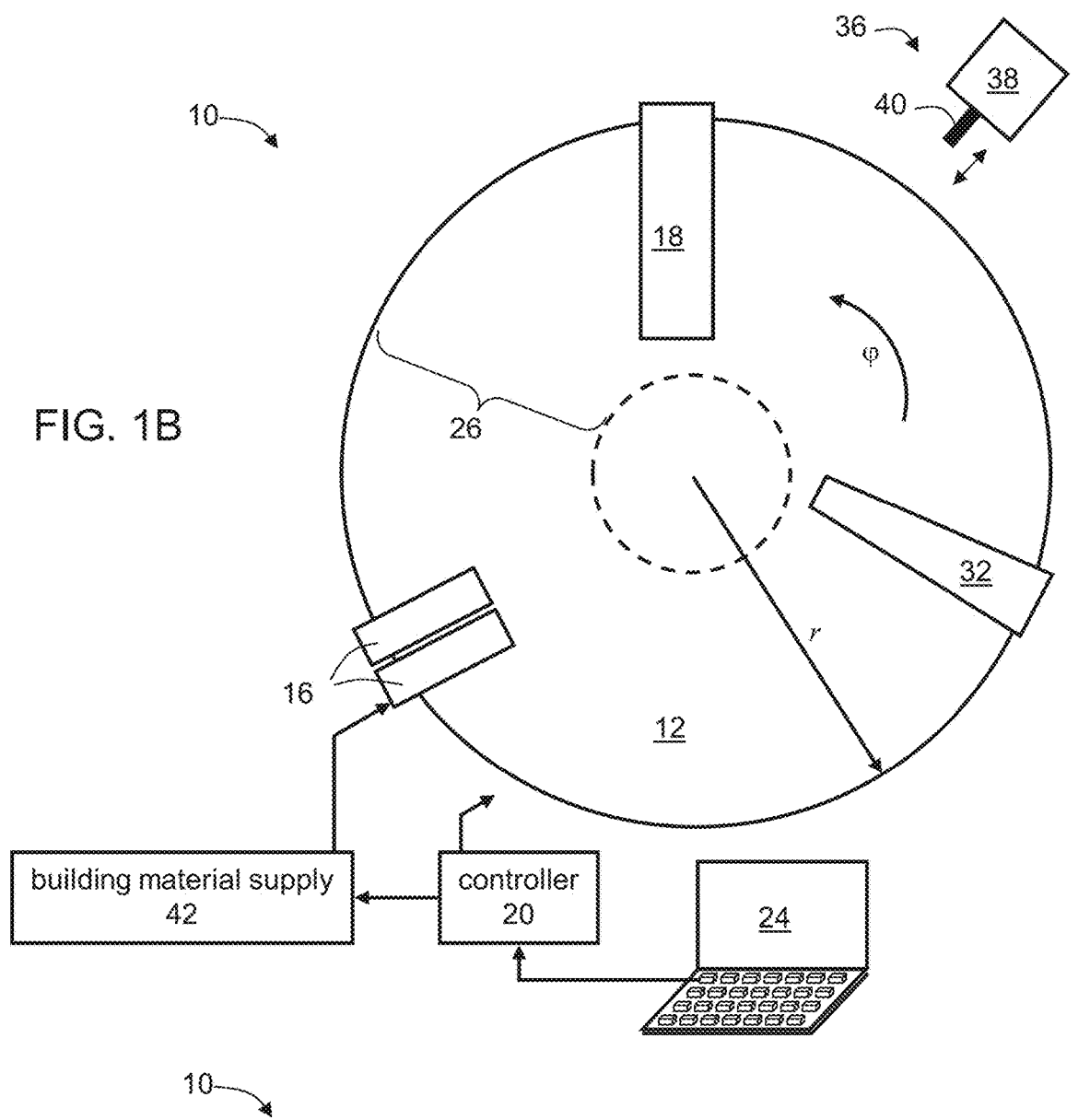
Figure 1C:
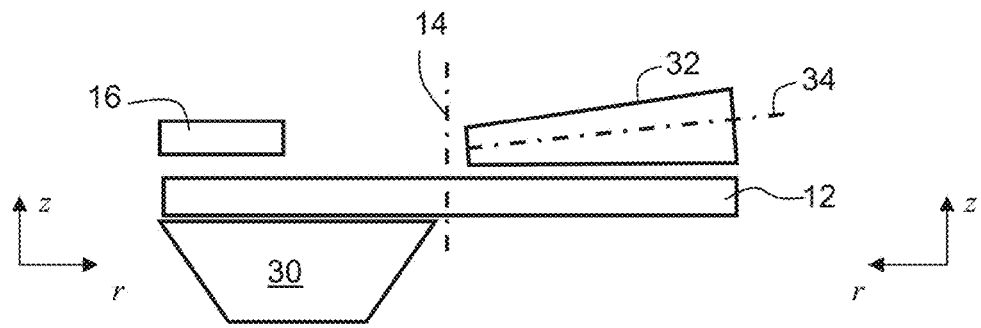
Figure 1D:
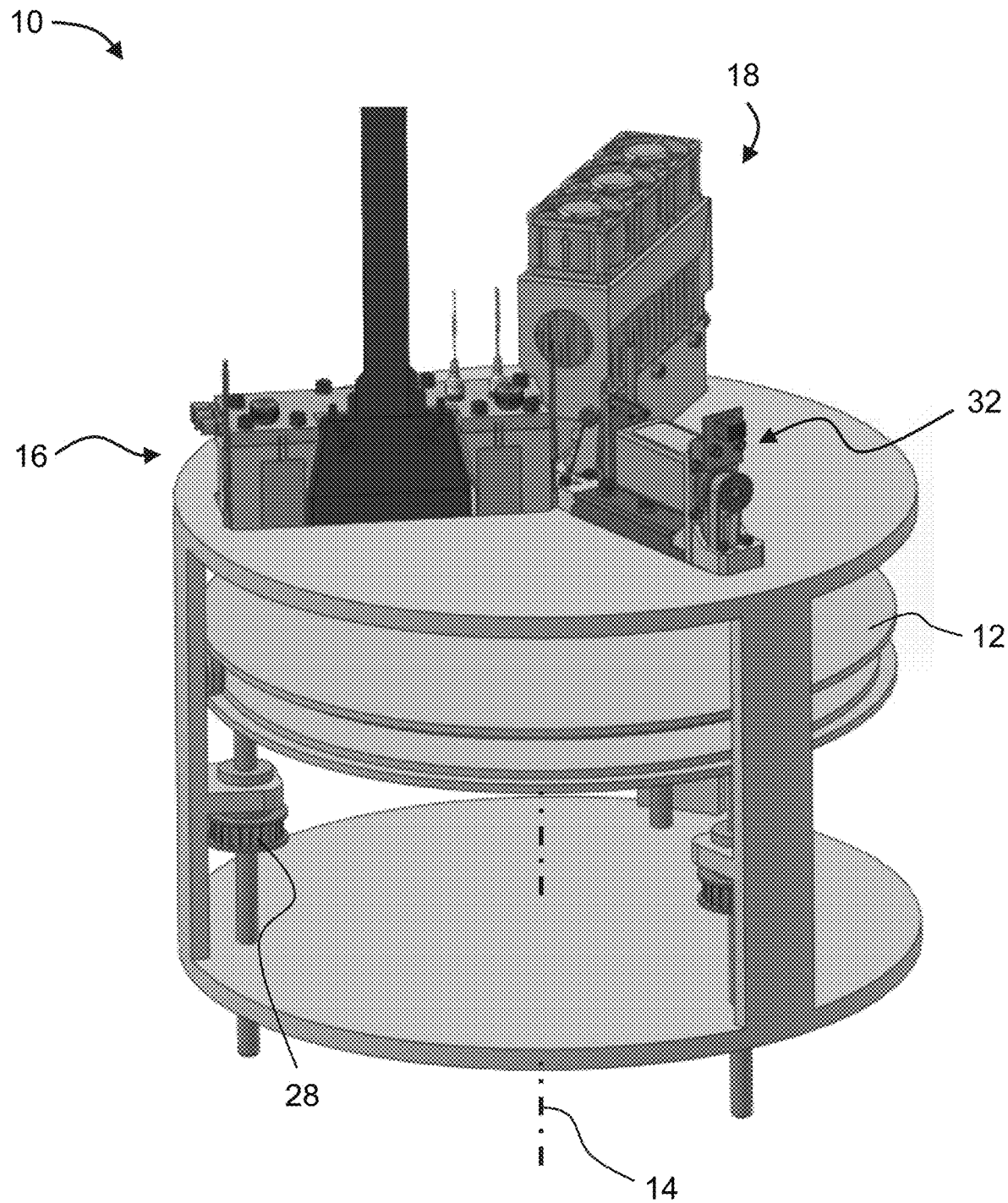

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of dispensing heads 16, optionally and preferably inkjet printing heads, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1 - \varphi_2$, and the angle between the linear nozzle arrays of the two heads is also $\varphi_1 - \varphi_2$.

In some embodiments, two or more printing heads can be assembled to a block of printing heads, in which case the printing heads of the block are typically parallel to each other. A block including several heads 16a, 16b, 16c is illustrated in FIG. 2C.

In some embodiments, system 10 comprises a tray support member 30 positioned below heads 16 such that tray 12 is between tray support member 30 and heads 16. Tray support member 30 may serve for preventing or reducing vibrations of tray 12 that may occur while heads 16 operate. In configurations in which printing heads 16 rotate about axis 14, tray support member 30 preferably also rotates such that tray support member 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, tray support member 30 preferably also moves vertically together with tray 12. In configurations in which the vertical distance is varied by heads 16 along the vertical direction, while maintaining the vertical position of tray 12 fixed, tray support member 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data in any of the aforementioned formats. The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
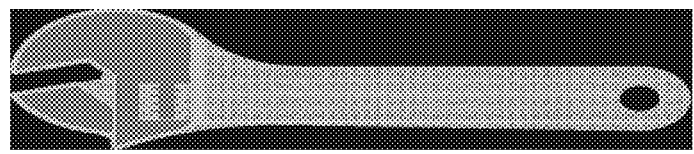
FIGS. 3A and 3B are schematic illustrations demonstrating coordinate transformations according to some embodiments of the present invention.
Figure 3B:
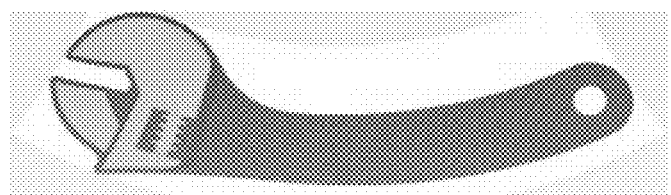

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises a solidification system 18, which may optionally and preferably comprise one or more radiation sources, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Solidification system 18 serve for solidifying (e.g., curing) the modeling material. In various exemplary embodiments of the invention the operation of solidification system 18 is controlled by controller 20 which may activate and deactivate solidification system 18 and may optionally also control the amount of radiation generated by solidification system 18.

In some embodiments of the invention, system 10 further comprises one or more leveling devices 32 which can be manufactured as a roller or a blade. Leveling device 32 serves to straighten the newly formed layer prior to the formation of the successive layer thereon. In some optional embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some optional embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

In some embodiments of the present invention the method dispenses digital material for at least one of the layers.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling or support material of each voxel or voxel block, obtained upon curing, is independent of the modeling or support material of a neighboring voxel or voxel block, obtained upon curing, such that each voxel or voxel block may result in a different modeling or support material and the new properties of the whole object are a result of a spatial combination, on the voxel level, of several different modeling materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole object are a result of a spatial combination, on the voxel block level, of several different modeling materials.

The present embodiments may relate particularly to printed sets of denture models. Denture models are provided as upper and lower sets and each set is customized for the individual patient, so that additive manufacturing is an efficient and highly appropriate form of manufacture for such objects. According to the present embodiments each denture model, that is each separate upper or lower denture model, may be printed within its own flexible sacrificial structure, or alternatively a number of upper and lower denture models may be printed within a shared flexible sacrificial structure and removed separately therefrom.

A consistent surface texture across denture models may be required as an aesthetic consideration (e.g. a continuous matte or glossy surface) but also if further processing is needed, e.g. the use of the dentures in thermoforming applications.

When printing an object without adjacent supporting structures, the surface texture of the object would generally appear glossy. However, the geometry of many objects includes overhangs, negative angles, curves and/or hollows, which require the formation of one or more supporting structures. The immediate proximity of a supporting structure to an object surface results in that surface having a matte texture due to some mixing of modeling materials and supporting material at the interface between them during printing. In contrast, other surfaces of the same object which are printed without an adjacent supporting structure would have a glossy texture, resulting in a final object with an inconsistent surface texture.

Denture models are generally printed upward-facing, and thus denture model surfaces may not require adjacent supporting structures, saving the user the potentially laborious and time-consuming process of support structure removal upon completion of the printing process. However, some denture model geometries do require supporting structures adjacent to some surfaces. Thus, in order to provide a consistent matte surface texture across the denture model, it is necessary for the model to have its surfaces covered with a layer of support material, which is preferably easily and quickly removed from the model once the printing is completed. In some embodiments, the side surfaces, the upper surface, and the lower surface of the printed model are in contact with a support material.

In a search for a solution to obtain a final model with a consistent/homogeneous surface without further use of time-consuming post processing steps, the present inventors devised a fabrication technique that forms a flexible sacrificial structure above or around the object in order to facilitate its removal and minimal post-processing steps. In some embodiments, the sacrificial structure is created digitally (i.e. digital or composite material) by jetting a combination of a modeling material (also used to create the object) and a support material. Therefore, in some embodiments, an object and its sacrificial structure may be manufactured on a relatively simple 3D printing system employing two distinct building materials only.

In some embodiments, all external surfaces of the object being formed (besides the lower surface which generally lies on a carpet/pedestal structure) are covered with a flexible sacrificial structure. The flexible sacrificial structure comprises a flexible overlay and an intermediate layer between the flexible overlay and the object. The flexible overlay is formed of a composite material comprising a combination of modeling material and support material. The intermediate layer generally comprises mainly or only support material and has a thickness of a few voxels thickness, e.g. 10-500 µm. In some embodiments, the composite material is manufactured from a mixture of modeling and support material printed in interlaced voxels according to preset proportions. It is noted that the pre-set proportions may vary across the composite material (i.e. anisotropic composite material), so that for example the composite material may be less flexible on the outside to make it easy to get hold of, and more flexible on the inside for ease of removal of the object from the flexible sacrificial structure.

According to some embodiments of the present invention each object, e.g. denture model, may be printed within its own flexible sacrificial structure and be easily removed therefrom. In some other embodiments of the present invention, multiple objects, e.g. multiple denture models may be printed at predetermined distances from one another, within a shared/common flexible sacrificial structure, from which they are individually removable.

A method of additive manufacturing of three-dimensional objects according to some embodiments of the present invention involves sequentially dispensing and solidifying layers. The layers may include (i) stacks of model layers arranged in configured patterns corresponding to shapes of one or more objects and being made of one or more modeling materials, (ii) an intermediate layer surrounding the shapes of one or more objects and comprising at least a support material, and (iii) an overlay of a composite material surrounding the intermediate layer. Optionally an air-gap may be provided between the surface of the object and the intermediate layer of support material, to reduce mixing of the support material of the intermediate layer and the modeling material of the object being printed.

The composite material is printed as multiple voxels of modeling material and support material, e.g. 0.1-1 mm. Flexibility of the composite material may be achieved by interspersing voxels of modeling material with voxels of support material.

The composite material forming the flexible overlay may be a mixture comprising at least 60% modeling material. In some embodiments, there is an increase in a percentage of the modeling material towards the outer surface of the flexible overlay. That is to say the proportion of modeling material to support material increases towards the outer part of the composite material, such that the composite material of the outer part of the flexible overlay comprises a digital combination of about 80% modeling material to 20% support material, and the inner part of the flexible overlay comprises a digital combination of about 60% modeling material to 40% support material making it more flexible than the outer part of the flexible overlay. In some embodiments, there is a gradient of flexibility between the inner part and the outer part of the flexible overlay.

In some embodiments, the intermediate layer between the flexible overlay and the object surface comprises at least 90% or at least 100% of a support material and may be between one and ten voxels in thickness, for example eight voxels in thickness. The intermediate layer may be hydrophilic, hydrophobic or amphiphilic.

In an embodiment of the invention, multiple objects may be printed within a shared flexible sacrificial structure, as described herein. The objects, e.g. denture models, are printed at predefined distances from each other and in predefined configurations relative to one another. In such an embodiment, the flexible sacrificial structure further comprises one or more skirt structures printed between each individual object stack. The skirts link between the flexible overlays covering the different objects and may be breakable to allow the objects or groups of objects to be separated from each other. That is to say, the skirts provide a breakable join.

The skirt structures may comprise a different digital combination of modeling material and support material, for example a composite material comprising a ratio of at least about 90% modeling material to about 10% support material, such that the skirt is more rigid than the rest of the flexible sacrificial structure. In some other embodiments, the skirt may comprise a ratio of modeling material to support material of at least about 95:5 or about 100:0.

In some cases the object being printed may have an overhang, negative angle/s, a void and/or curved area/s such that layers of the object, the intermediate layer and the flexible overlay in turn need a supporting structure of their own to enable them to be printed. Such a supporting structure is typically located where the object shape requires vertical support from below. This supporting structure may be distinct from the composite material of the flexible sacrificial structure with respect to the object and provides support for continued printing, both of the overhanging parts of the object and of the associated intermediate layer and flexible overlay. The support structure may be formed of a matrix of modeling material and support material as known in the art.

The materials used for forming the object and the flexible sacrificial structure (including the flexible overlay, the intermediate layer, the skirt and the supporting structure) may be selected from two basic materials only, one being a modeling material and the other a support material, and therefore the entire construction may be made using a printer with two nozzles or at least two sets of independently usable nozzles. For printers with greater numbers of nozzles or sets of nozzles, composites of three or more materials may be printed and used.

The removal of the object from the sacrificial structure according to some embodiments of the present invention is unlike conventional techniques for removing sacrificial structures from objects, in which water-jet or other chemical methods, such as dissolution in a solvent, with or without heating are employed. In these conventional methods the sacrificial structure is removed from the object, generally by cleaning it away, and the sacrificial structure is generally removed in pieces.

A representative example of a modeling material suitable for the present embodiments is VeroWhitePlus™, marketed by Stratasys Ltd., Israel. A representative example of a support material suitable for the present embodiments is SUP706™, marketed by Stratasys Ltd., Israel.

Figure 4:
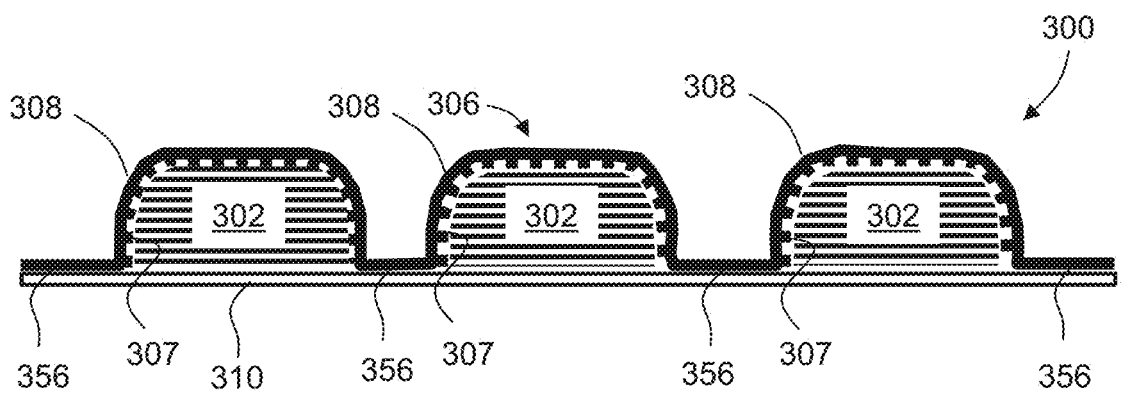
FIG. 4 is a simplified schematic diagram showing, in cross section, three printed objects in a single printed sacrificial structure, wherein the objects can be individually removed in accordance with embodiments of the present invention.

Reference is now made to FIG. 4, which is a simplified diagram illustrating an embodiment of the present invention.

A structure 300 is printed using additive manufacturing. The structure comprises one or more objects 302 which are stacks of layers of a modeling material forming predetermined shapes, and the objects are printed within a flexible sacrificial structure 306. The flexible sacrificial structure 306 includes intermediate layer 307 and flexible overlay 308 and both the intermediate layer 307 and flexible overlay 308 at least partly envelope each of the objects 302 individually. In the present embodiment, flexible sacrificial structure 306 comprises skirt structures 356 that connect flexible overlays 308. A carpet 310 of support material or combination of support material and modeling material may either be printed as part of the flexible sacrificial structure or may be printed on the printing tray beneath the entire object-flexible sacrificial structure construction as a base for the printing to enable easy removal of the entire construction or parts of it from the printing tray upon completion of printing.

Thus, each object is made up of stacks of model layers arranged in configured patterns corresponding to shapes of the object or objects it is desired to fabricate, and being made of one or more modeling materials. That is to say each object may be made of one or more materials, and different objects may be made of the same or different materials. In general, the present embodiments are particularly useful in the case where each object is similar but not the same. The present embodiments are also particularly useful when all the objects are fabricated by an additive manufacturing system capable of dispensing one type of modeling material formulation and one type of support material formulation in each layer, in which case all the objects are made of the same modeling material.

The flexible sacrificial structure 306 may thus comprise an intermediate layer 307 and a flexible overlay 308 having a consistency to allow for intact removal from the object. All parts of the flexible sacrificial structure include stacks of sacrificial layers of various materials and/or combinations of materials to achieve the required mechanical properties for that part of the flexible sacrificial structure, and the flexible sacrificial structure may fully or partly envelope the stacks of model layers forming the individual objects. The individual objects can be individually removed from the sacrificial structure that is wrapped around the objects.

Figure 5:
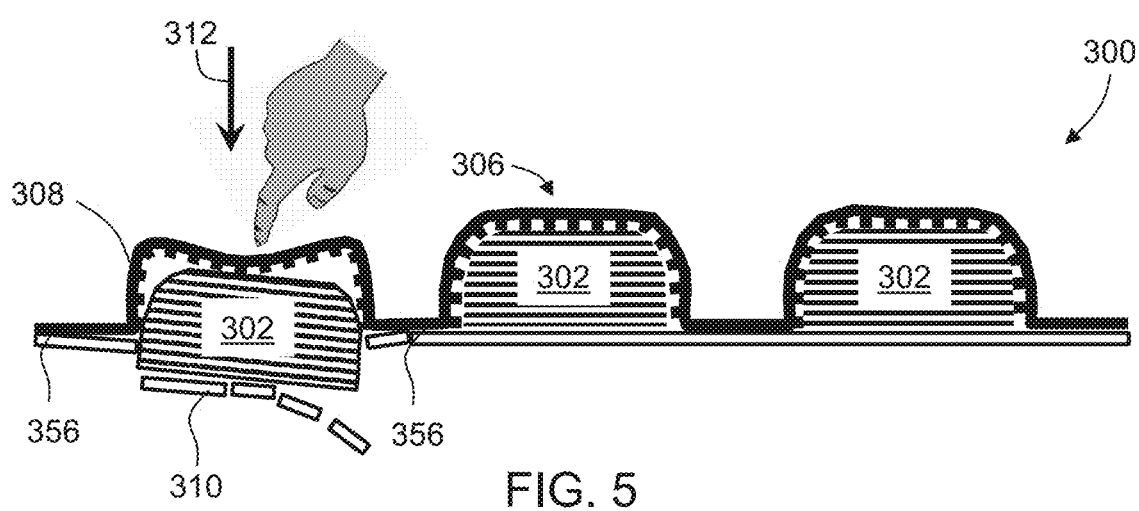
FIG. 5 shows the cross section of FIG. 4 when one of the objects is being pressed out of the sacrificial structure.
Figure 6:
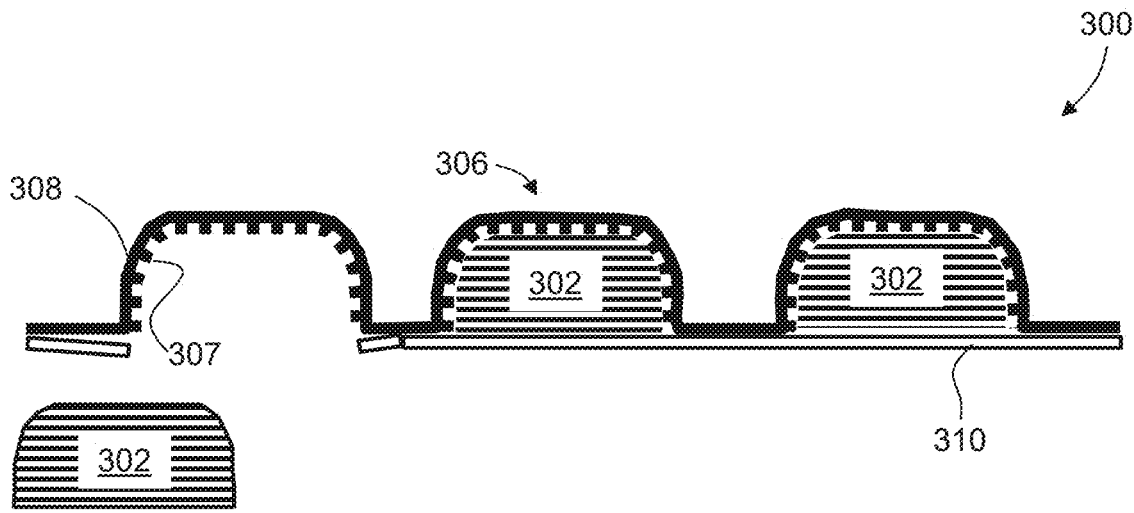
FIG. 6 shows the cross section of FIG. 4 after one of the objects has been separated from the sacrificial structure.

As shown in FIG. 5, after removal from the printing tray, pressure may be applied on the flexible overlay 308 in the direction of arrow 312 to push the object 302 out of the flexible sacrificial structure 306 through carpet or remnants of carpet 310 and thus expose the object. Object 302 is removed from the flexible sacrificial structure 306 as shown in FIG. 6. Most of the intermediate layer 307 remains adhered to flexible overlay 308 and thus is for the most part also separated from the object at the same time. That is to say the object is pushed or pressed out of the flexible sacrificial structure. It will be appreciated that the object may be pressed out of the flexible sacrificial structure by the user at any suitable position, not just from above, and may break or tear at any point due to the pressure applied to it to remove the object. The two other objects 302 shown in FIG. 6 remain undisturbed within the flexible sacrificial structure until each is in turn individually removed. In some embodiments, all the objects 302 are extracted from flexible sacrificial structure 306 at once, for instance with a tool or jig suitable to apply a pressure on several locations of structure 306 simultaneously.

Figure 7:
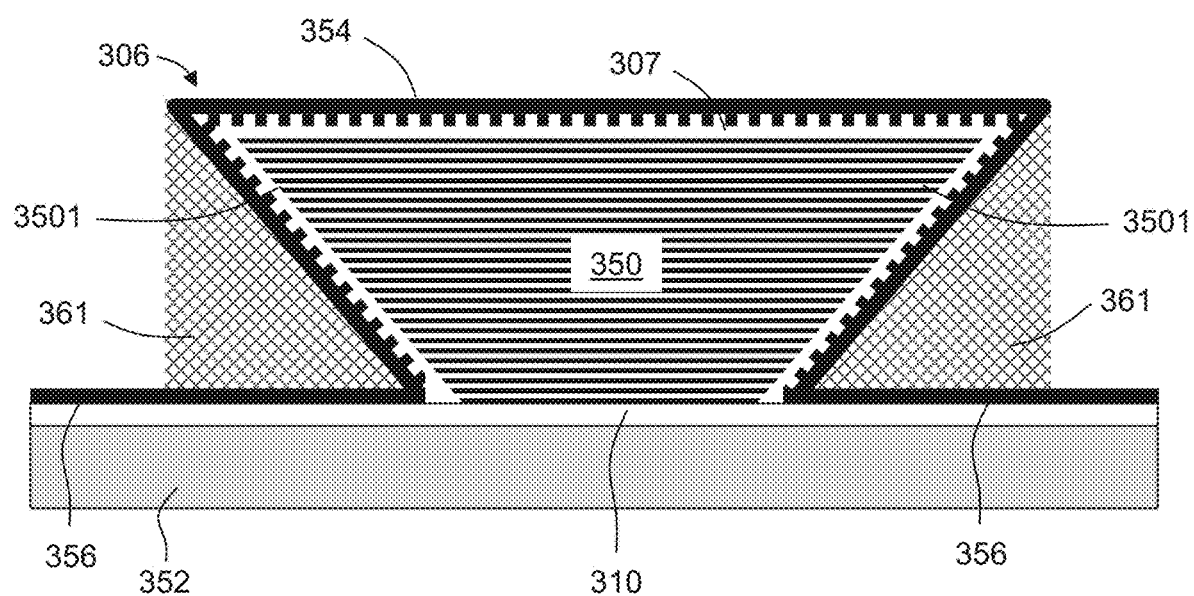
FIG. 7 is a simplified schematic diagram exemplifying a cross section of a sacrificial structure that can be fabricated in cases the object's shape includes a concavity and/or negative angles.

Reference is now made to FIG. 7, which is a simplified schematic diagram exemplifying a cross section of a flexible sacrificial structure that can be fabricated in cases where the object's shape includes a concavity or overhang (i.e. negative angles). In such a case, parts of the composite material may be left unsupported at various stages of the additive manufacturing process and the issue is overcome by dispensing support material to form an extra support structure as illustrated.

Thus, object 350 is wider at the top than at the bottom, leaving overhangs 3501 at either side. The object is printed on printing tray 352, with a flexible structure 306 including flexible overlay 308 and intermediate layer 307 that covers its sides and upper surface. The lower surface of object 350 lies on carpet/pedestal 310. Since overhanging portions 3501 of the object and the parts of flexible structure 306 that cover them should be supported during the printing process, supporting structure 361 is printed, preferably between skirt 356 and flexible overlay 308. In this way, supporting structures 361 is removed together with flexible sacrificial structure 306, and object 350 does not need additional post-processing cleaning time, which would have been the case if supporting structure 361 was built between flexible overlay 308 and intermediate layer 307. Supporting structures typically comprise either supporting material alone or a mixture of supporting material and modeling material.

Skirt 356 is optionally printed on the tray, on top of a carpet base 310 and the thickness of the skirt is a parameter that may be defined during the printing process. The skirt 356 connects between parts of the flexible sacrificial structure 306 covering the different printed objects, and the objects or groups of objects may be separated from each other by snapping, tearing or breaking skirt 356 at desired breaking points.

Intermediate layer 307 may be printed between object 350 and flexible overlay 308 and may typically be one or a few voxels in thickness of pure support material which is soft, and thus typically may easily separate from the object fully or partly together with flexible overlay 308. Remnants of support material left on the extracted object may be easily removed with a suitable cleaning process.

Figure 8:
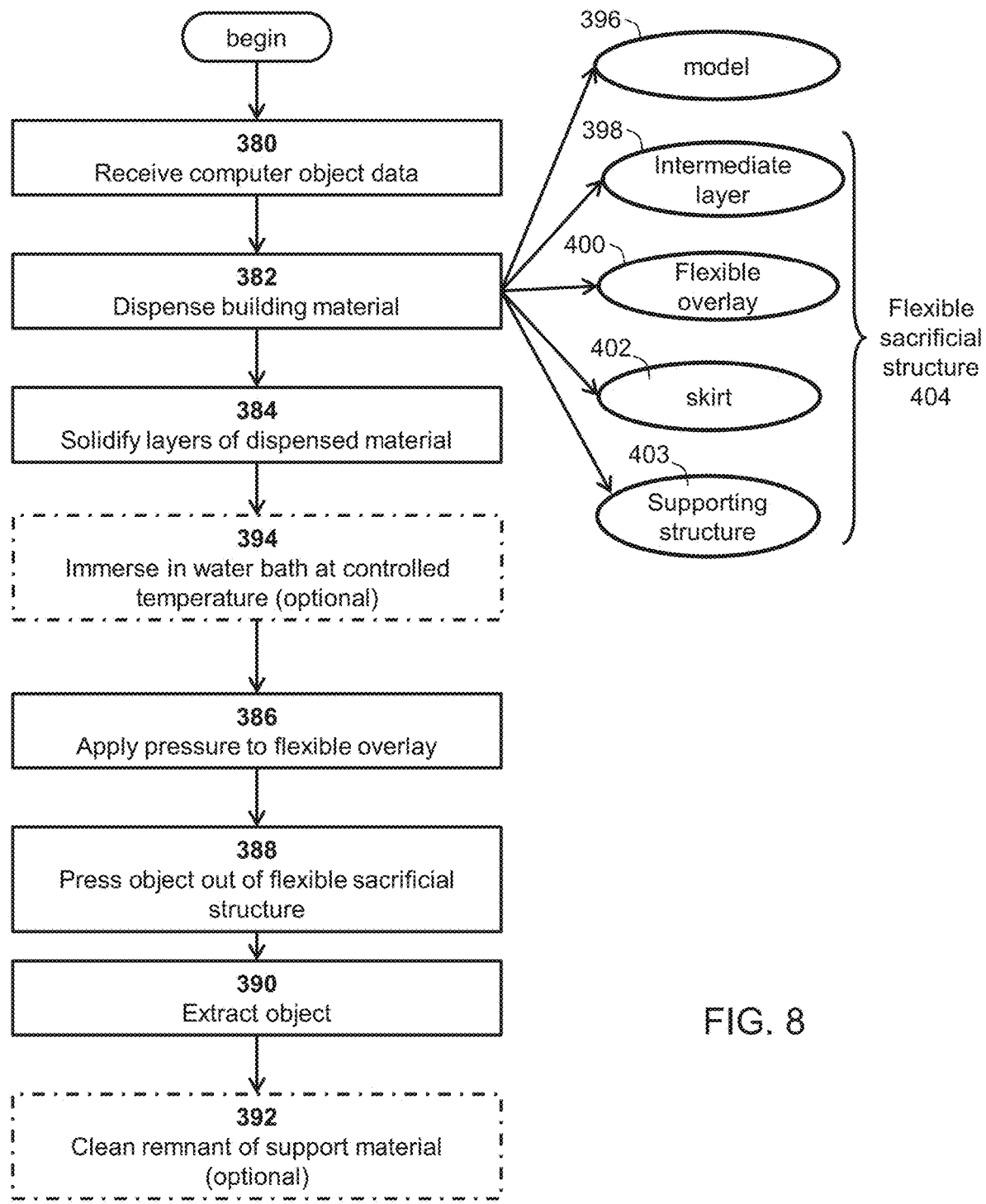
FIG. 8 is a simplified flow chart showing the printing and removal of an object according to the embodiments of FIGS. 4-6.

Reference is now made to FIG. 8, which is a flow chart illustrating a process for printing a 3D object within a flexible sacrificial structure and then removing the object from the structure according to embodiments of the present invention. A 3D printing or additive manufacturing system receives computer object data (box 380) and dispenses building material (box 382) accordingly to provide the object i.e. model 396, and flexible sacrificial structure 404, including intermediate layer 398, flexible overlay 400 as well as the skirt 402 and any supporting structure 403 that may be needed. The layers of building material are dispensed one by one, and each layer of building material is solidified (box 384) prior to dispensing the following layer.

Once printing is complete, the structure may optionally be placed in a controlled temperature environment to soften the flexible sacrificial layer and extract the object from the structure, e.g. a hand-hot water bath. In order to release the objects, pressure is applied to the part of the flexible sacrificial structure, i.e. flexible overlay, covering each individual object (box 386) to press the object out of the flexible sacrificial structure (box 388) and the object is extracted (box 390). The object may then optionally be cleaned (box 392), to ensure complete removal of remnant support material. The controlled temperature environment is indicated by box 394, and may be provided by a water bath.

In some embodiments, once all the layers are formed (box 384), the method proceeds to 394 at which the object, now formed and surrounded with a flexible sacrificial structure is optionally immersed in a water bath. The water bath may be kept at a controlled temperature, for example hand-hot, or around 40 to 50° C. or at 45° C. or 46° C., and this allows for further softening of the intermediate layer of support material, so as to enable easy removal of the object from the flexible sacrificial structure. In embodiments the intermediate layer may be hydrophilic so that the water bath allows for absorption of water by the intermediate layer and consequential additional softening of the intermediate layer. The object may be left in the water bath for a preset interval of time, for example twenty minutes, after which the object is removed from the flexible sacrificial structure (boxes 386-390). Much of the intermediate layer may be expected to adhere to the flexible overlay and be removed with it. The object may alternatively be removed while still submerged in the water bath.

In 392 the object may be cleaned of any remnants of the intermediate layer.

It is expected that during the life of a patent maturing from this application many relevant building materials for AM will be developed and the scope of the term modeling material and support material is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated herein above and as claimed in the claims section below find experimental support in the following examples.

EXAMPLES

Reference is now made to the following examples, which together with the above descriptions illustrate some embodiments of the invention in a non-limiting fashion.

Experiments were performed to design and fabricate a sacrificial structure according to some embodiments of the present invention. All experiments were performed using an inkjet three-dimensional printing system loaded with a single modeling material (VeroWhitePlus™) and a single support material (SUP706™).

Figure 9:
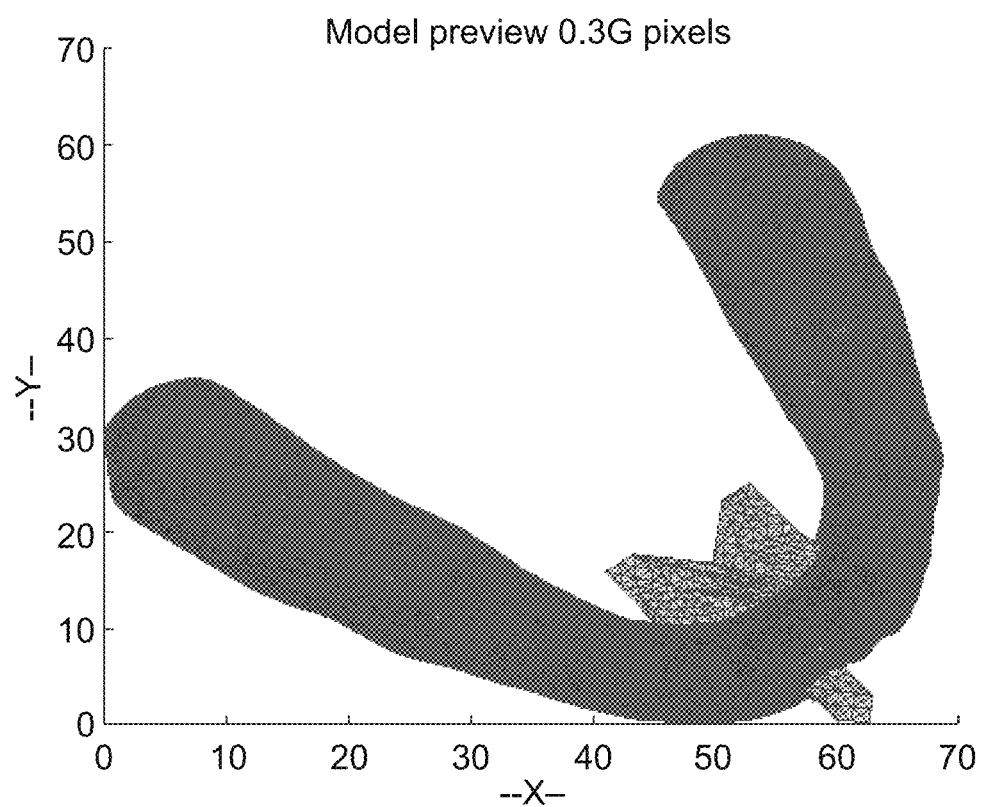
FIG. 9 illustrates a single layer view of an object to be printed according to the present embodiments.
Figure 10A:
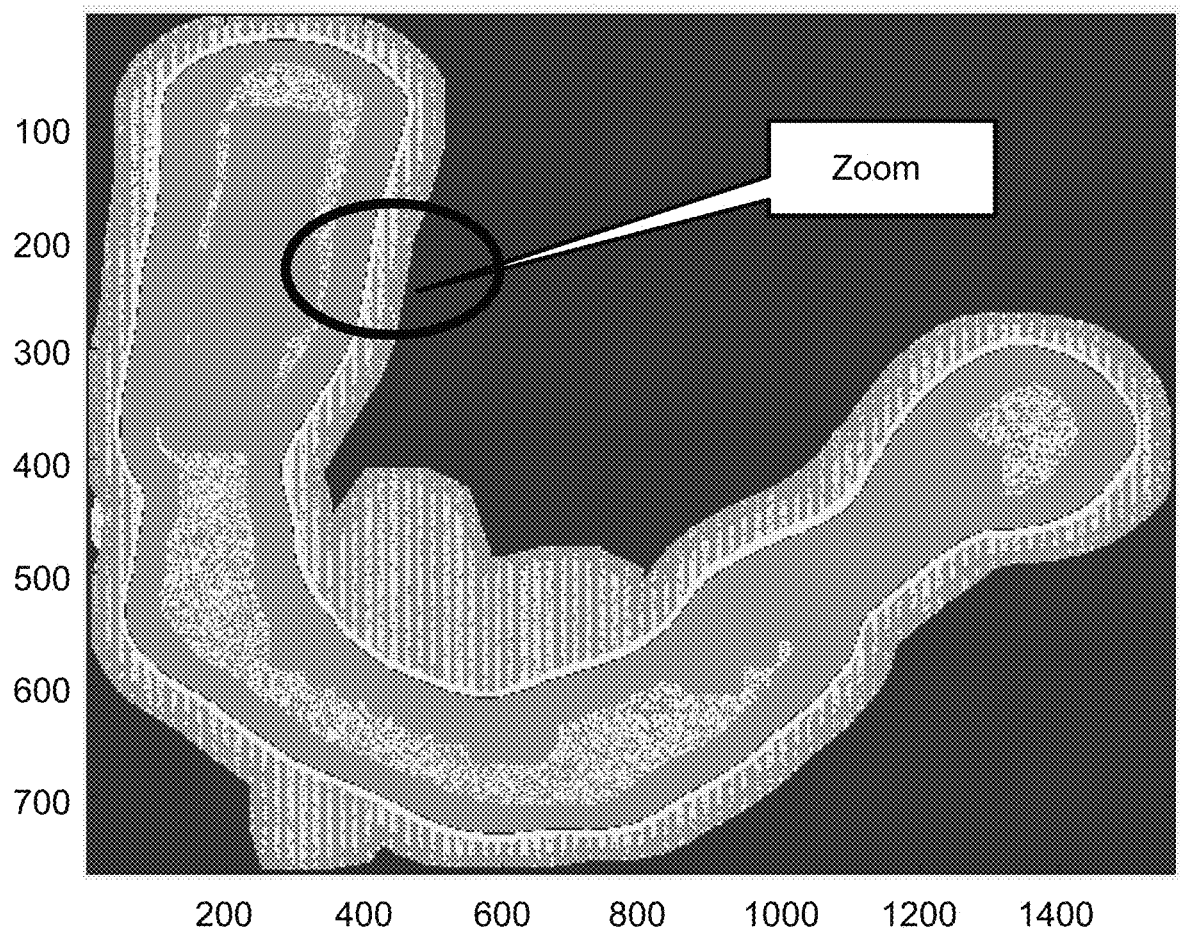
FIG. 10A shows a single layer view of the object of FIG. 9 embedded in the sacrificial structure.
Figure 10B:
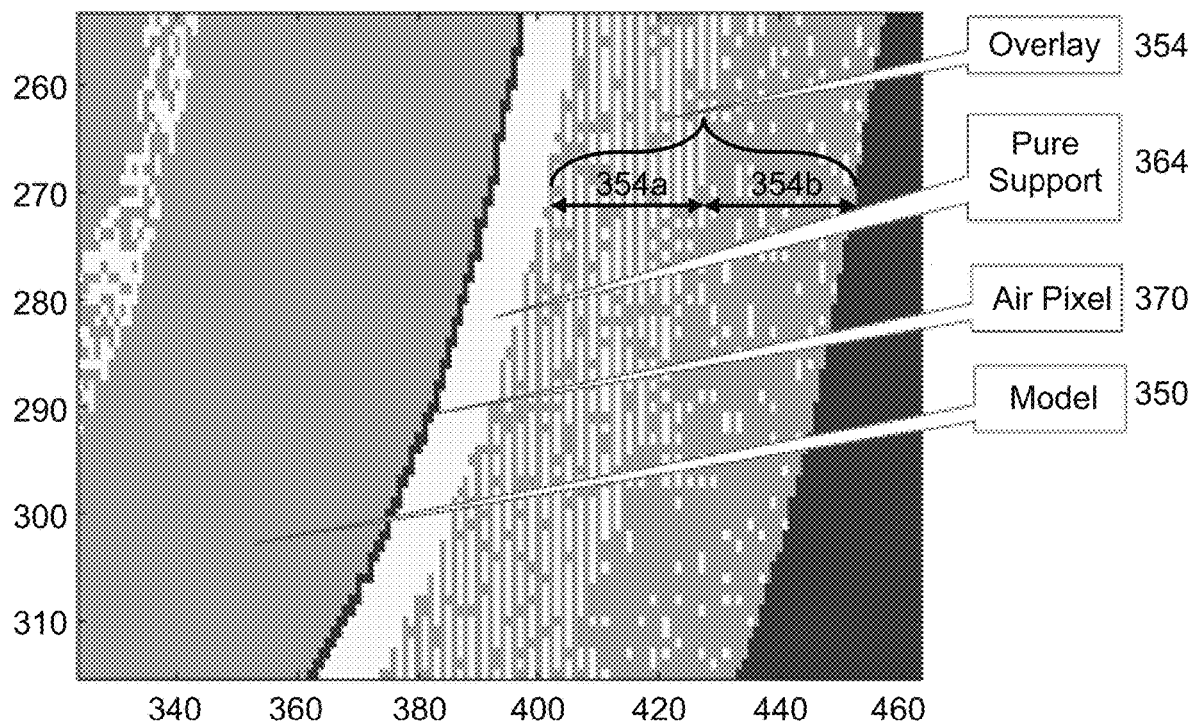
FIG. 10B is a detailed view (zoom-in) of a part of the layer shown in FIG. 10A.

FIG. 9 illustrates a digital representation of a single layer of the object prior to printing. FIG. 10A shows a digital representation of a single layer of the full structure including both the object and the flexible sacrificial structure, and FIG. 10B is a zoom-in showing in more detail part of the structure of the layer shown in FIG. 10A (within the circle). FIG. 10B shows the object i.e. model 350, an optional air pixel—unprinted voxels 370 forming an air gap between the model surface and the flexible sacrificial structure, pure support material forming an intermediate layer 364 and flexible overlay 354. As can be seen in this figure, overlay 354 may comprise an internal region 354a having a higher ratio of supporting material to modeling material (e.g. 40/60) and an external region 354b having a lower ratio of supporting material to modeling material (e.g. 20/80). The region indicated as pure support is the equivalent of intermediate layer 307 shown in FIGS. 4-6.

Figure 11:
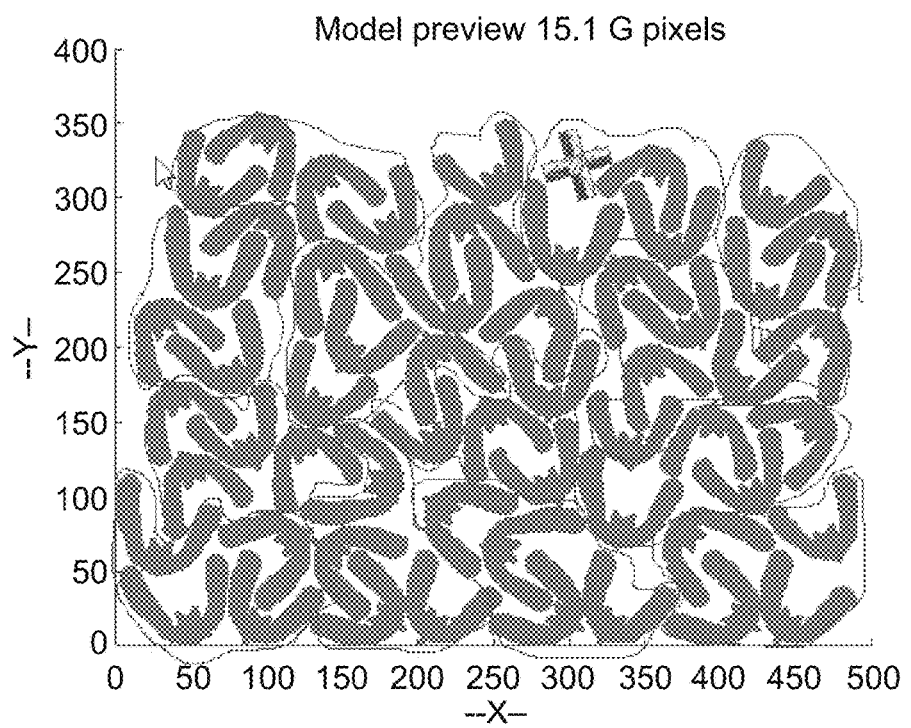
FIG. 11 illustrates a single layer view of multiple objects to be printed according to the present embodiments.
Figure 12A:
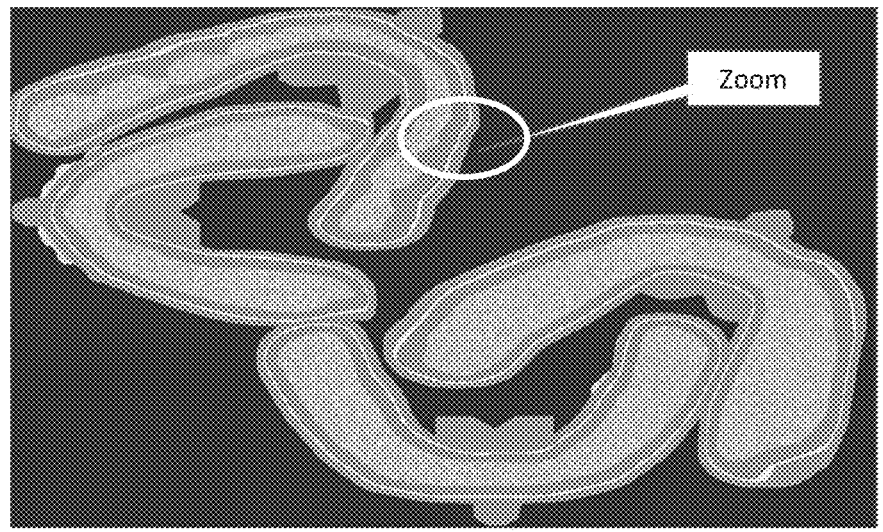
FIG. 12A shows a partial single layer view of several objects of FIG. 11 embedded in the sacrificial structure.
Figure 12B:
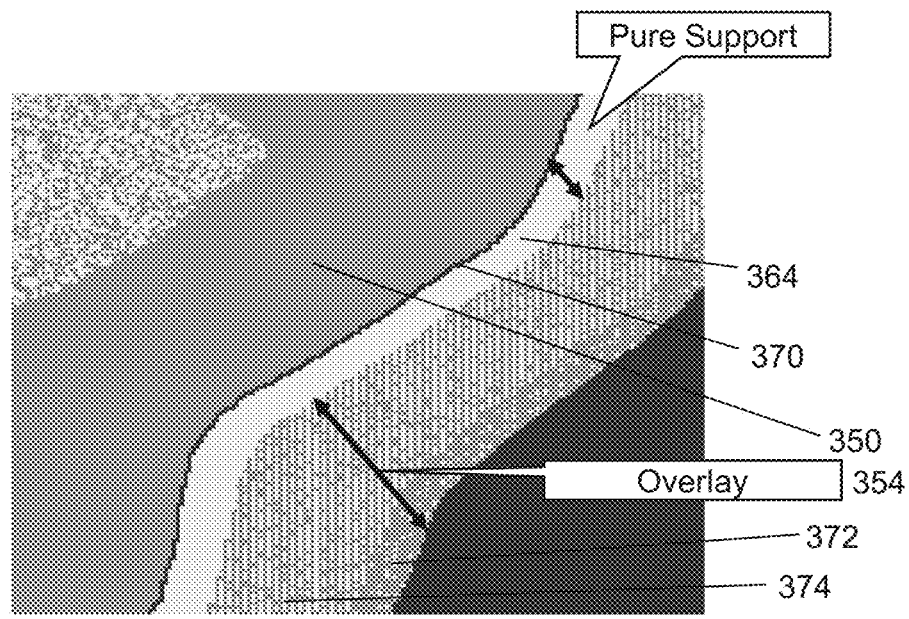
FIG. 12B is a detailed view of FIG. 12A.

FIG. 11 illustrates a digital representation of a single layer, comprising multiple objects to be printed together. FIG. 12A shows a partial single view of four objects of FIG. 11 embedded in the sacrificial structure, and FIG. 12B is a detailed view (zoom-in) of the part of FIG. 12A shown in the circle. FIG. 12B again shows the object 350, air gap—unprinted voxels 370, pure support material forming an intermediate layer 364 and flexible overlay 354. The depth of the flexible overlay is a parameter that may contribute to the distribution of its mechanical properties, including the relative ratios of modeling material and support material in the flexible overlay regions (e.g. inner and outer regions).

In FIGS. 10A, 10B, and 12A and 12B, voxels filled with the modeling material are shown in a dark color (e.g. dark grey), and voxels filled with the soft support material are shown in a lighter color (e.g. light grey). Thus the object region 350 is mostly dark grey, the intermediate layer 364 is pure light grey, and the flexible overlay is a mixture of light and dark voxels, to produce a composite material of varying flexibility. In the embodiment illustrated, an outer part of the flexible overlay 372 has more modeling material than an inner part of the flexible overlay 374, which instead has more support material than the outer part. In this way a flexible overlay is printed that is less flexible with increasing radius towards the outside, thus making the flexible overlay easier to grip from the outside and increasing overall strength, while ensuring greater flexibility towards the intermediate layer immediately adjacent to the object.

Figure 13:
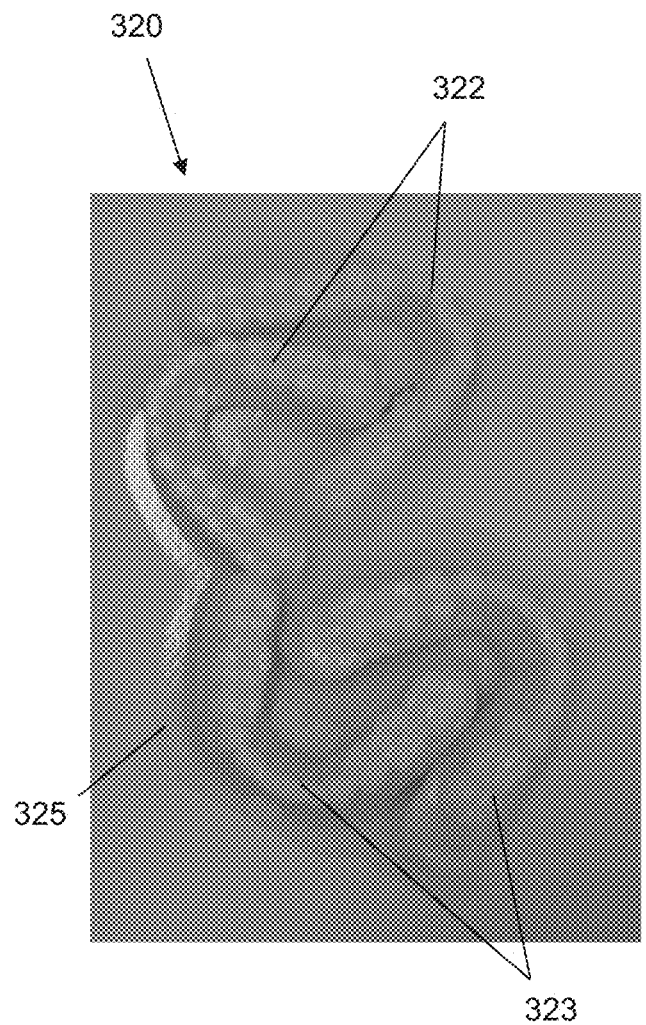
FIG. 13 is a photograph of two sets of printed dentures in a sacrificial structure according to embodiments of the present invention.

FIG. 13 shows a photograph of a printed structure 320 according to embodiments of the present invention. The printed structure 320 comprises two pairs of dentures 322 and 323 formed together in a single flexible sacrificial structure 325.

Figure 14:
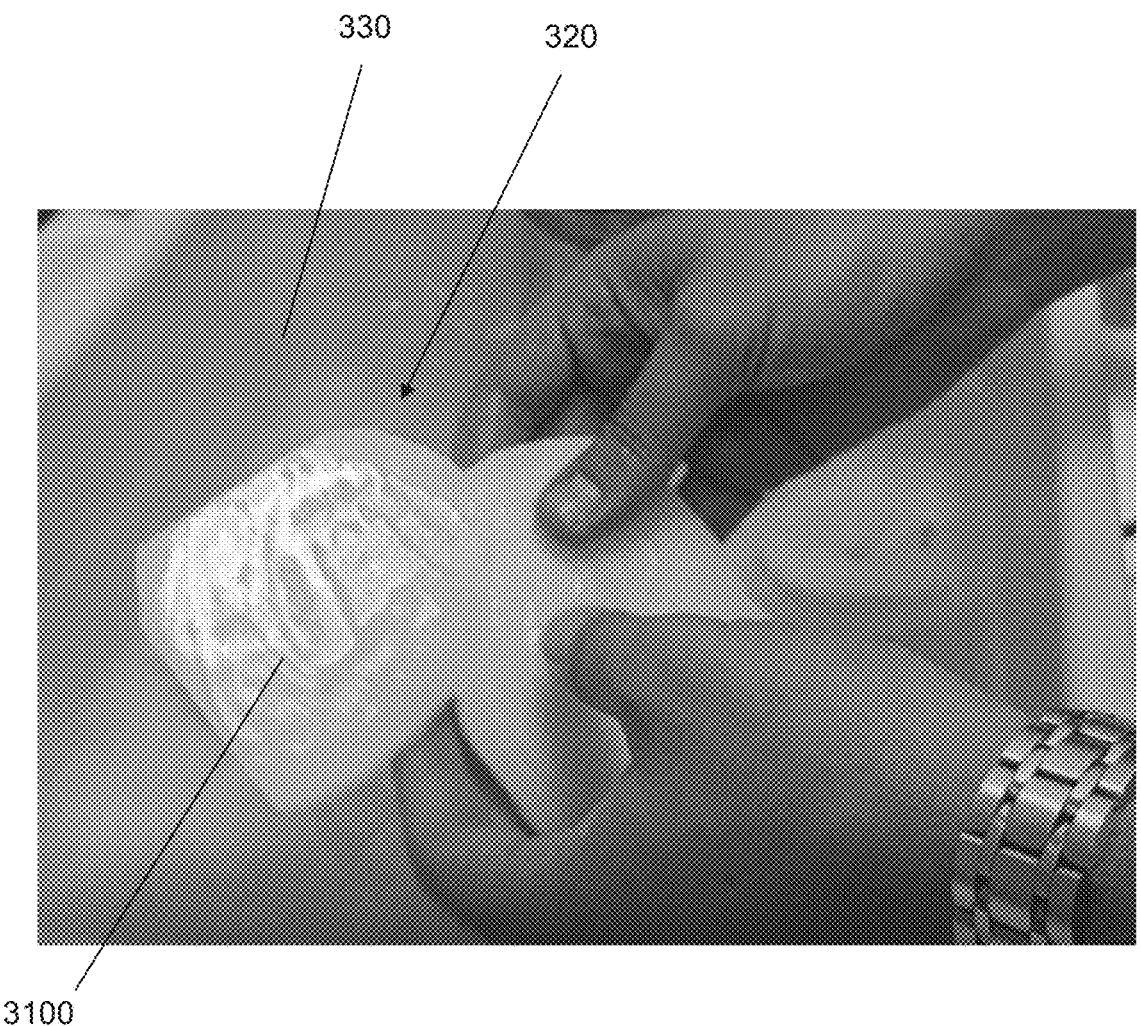
FIG. 14 is a photograph of the sets of printed dentures of FIG. 13 being removed from a water bath, before separation of the printed objects from the sacrificial structure according to embodiments of the present invention.
Figure 15:
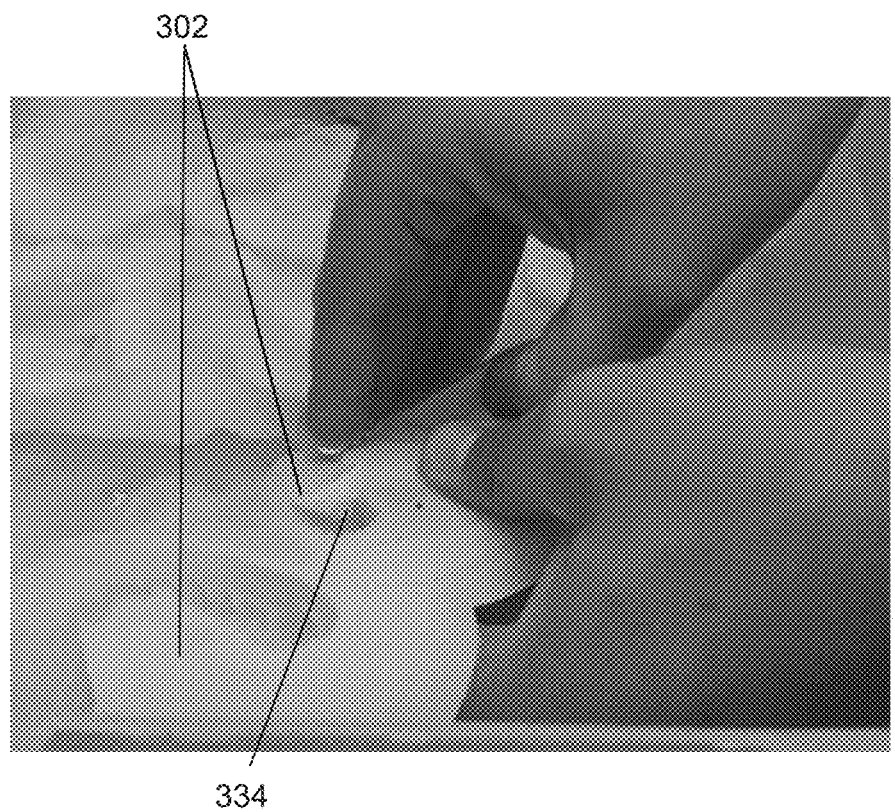
FIGS. 15 and 16 are photographs of the sets of printed dentures of FIG. 13 during separation of one of the objects from the sacrificial structure.
Figure 16:
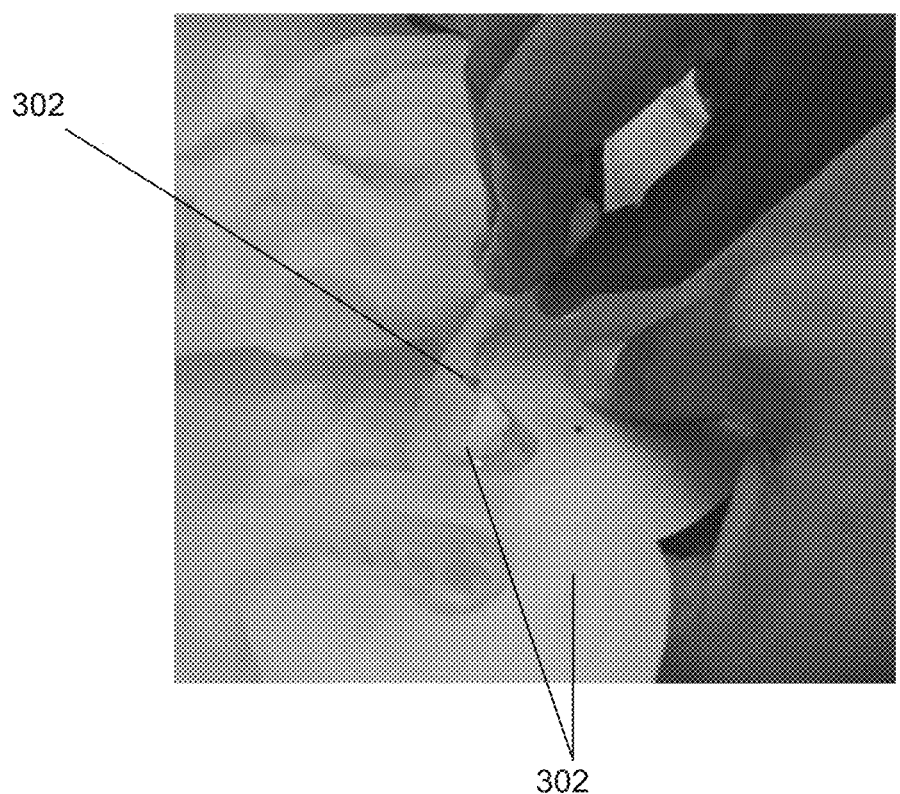

Referring now to FIG. 14, the printed structure 320 is optionally placed in a water bath 330 which is kept at a controlled temperature. For a prototype a hand-hot temperature of 43° C. was used. Structure 320 can be held with its base 3100 facing the user and the object parts are pressed upwards from below. FIGS. 15 and 16 show one object 302 being pulled out of the flexible sacrificial structure at break line 334, where FIG. 16 also shows one object 302 being further extracted. In each of FIGS. 15 and 16, one or more additional objects 302 may be seen still within the printed structure, pre-removal.

Pressure may be applied to the structure within the water bath, although as illustrated, it is typically more convenient to remove the structure from the water bath, remove the object and then optionally return the object to the water bath for final cleaning.

The object 302, once extracted, may optionally be placed in a cleaning solution for a preset duration. An exemplary cleaning solution may comprise 2% NaOH and 1% $Na_2SiO_3$ and the duration may be 25 to 30 minutes followed by cleaning under running water and drying in an airstream.

Figure 17:
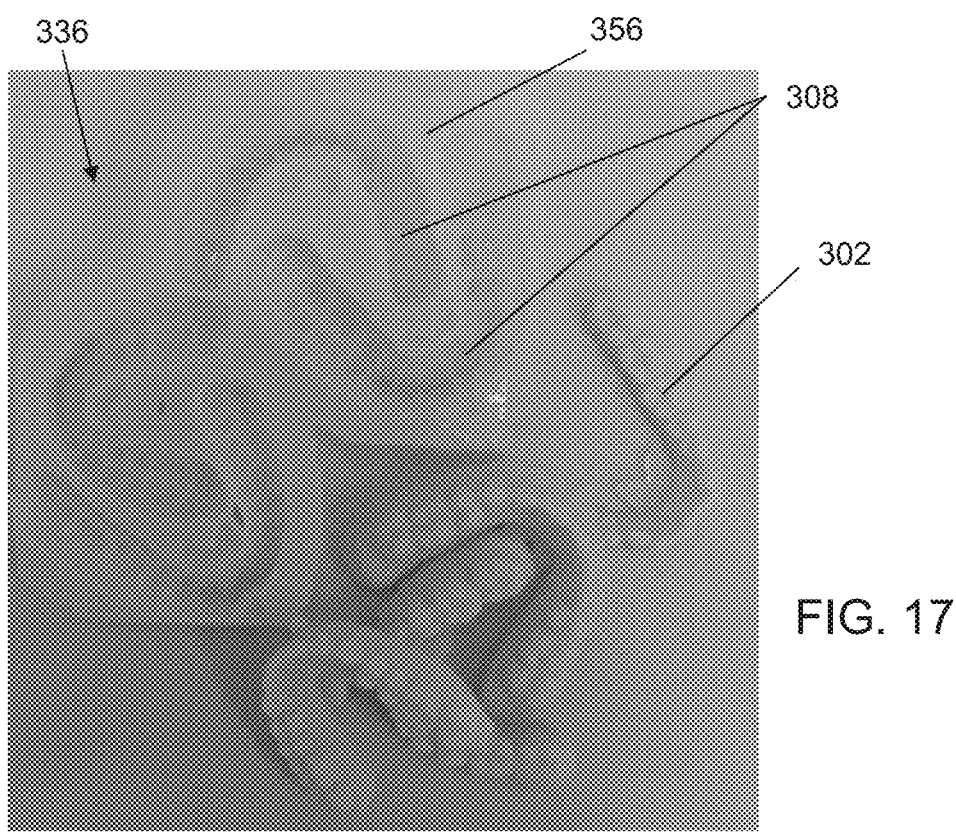
FIG. 17 is a photograph of the sets of printed dentures of FIG. 13 after separation of the objects from the sacrificial structure, according to embodiments of the present invention.
Figure 18:
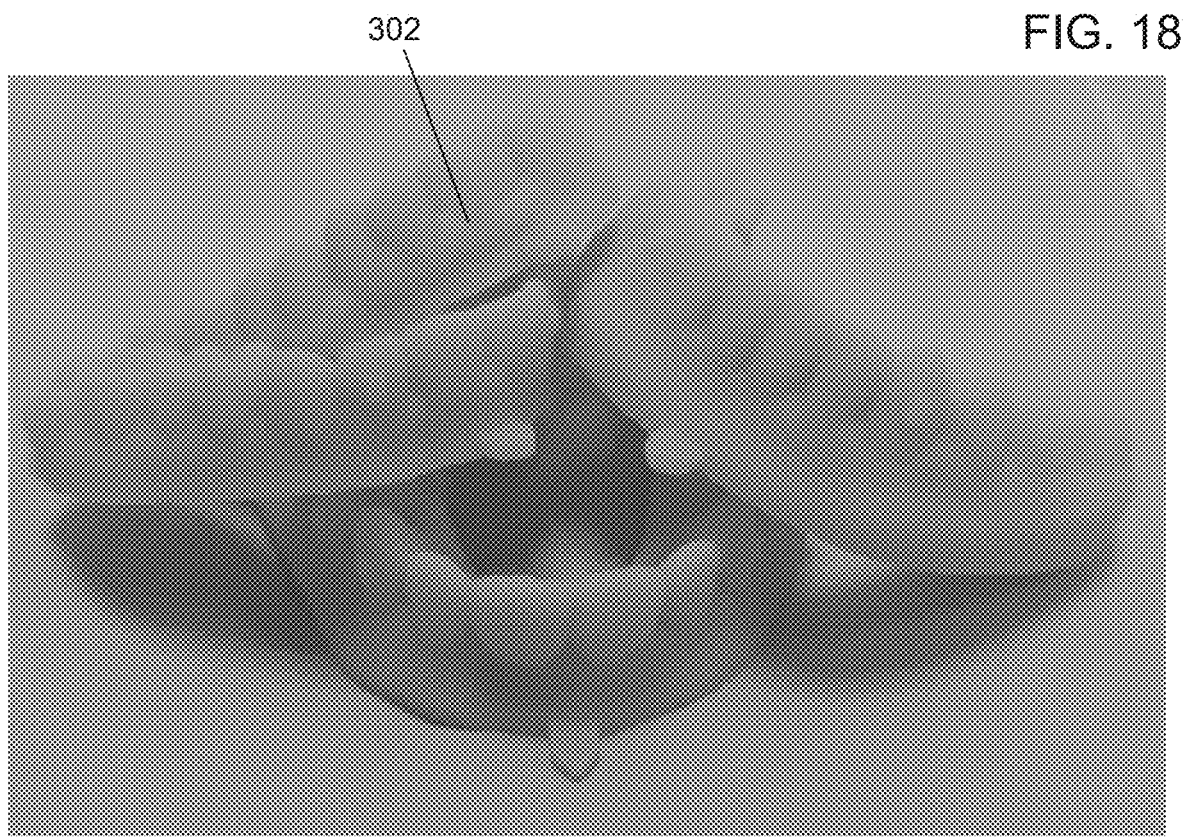
FIG. 18 is a photograph of the objects of FIG. 17 after extraction from the sacrificial structure.

FIG. 17 shows objects 302 after removal from the flexible sacrificial structure 336. Skirt structure 356 and flexible overlays 308 can be clearly distinguished. FIG. 18 shows the removed final objects 302 after cleaning, washing and drying.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of additive manufacturing of three-dimensional objects, the method comprising:

sequentially dispensing and solidifying layers, the layers comprising:

(i) at least one stack of model layers comprising one or more modeling materials arranged in configured patterns corresponding to shapes of said three-dimensional objects;

(ii) an intermediate layer surrounding said at least one stack of model layers and comprising a support material;

(iii) a flexible overlay surrounding said intermediate layer and object; and (iv) a breakable skirt structure joining the flexible overlay covering each of said objects; and extracting said objects from said flexible overlay by application of pressure to said flexible overlay, wherein said flexible overlay comprises an anisotropic composite material.

2. The method of claim 1, wherein said flexible overlay comprises at least one modeling material and at least one support material.

3. The method of claim 1, wherein said first intermediate layer has a thickness of between 10 and 500 μm.

4. The method of claim 1, comprising placing said objects with said flexible overlay and said breakable skirt structure in a controlled temperature environment for a predetermined time prior to and/or during its removal from said flexible overlay.

5. The method of claim 4, wherein the controlled temperature environment is a controlled temperature water bath.

6. The method of claim 1, wherein said breakable skirt structure comprises a combination of a modeling material and a support material.

7. The method of claim 6, wherein said combination comprises at least 90% modeling material.

8. The method of claim 1, further comprising providing a support structure, said support structure being outside of said flexible overlay with respect to said object.

9. The method of claim 1, comprising placing said extracted objects in a cleaning solution for a predetermined duration.

10. The method of claim 1, wherein said objects are dental models.

11. The method of claim 1, wherein said intermediate layer is made of a support material.

12. The method of claim 1, wherein said objects, prior to said extraction from said overlay, are separated from each other by snapping, tearing or breaking said skirt structure at desired breaking points.

13. The method of claim 1, wherein said anisotropic composite material forms a gradient of flexibility between the inner part and the outer part of said flexible overlay.

14. The method of claim 1, wherein said anisotropic composite material comprises about 60% modeling material at the inner part of said flexible overlay and about 80% modeling material at the outer part of said flexible overlay.

* * * * *